(12) United States Patent
Wang

(10) Patent No.: US 11,675,201 B2
(45) Date of Patent: Jun. 13, 2023

(54) PACKAGING STRUCTURE OF HEAD MOUNTED TERMINAL AND HEAD MOUNTED TERMINAL

(71) Applicant: Qingdao Pico Technology Co., Ltd., Qingdao (CN)

(72) Inventor: Zishang Wang, Qingdao (CN)

(73) Assignee: QINGDAO PICO TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 17/882,944

(22) Filed: Aug. 8, 2022

(65) Prior Publication Data

US 2023/0004012 A1 Jan. 5, 2023

Related U.S. Application Data

(63) Continuation of application No. PCT/CN2021/132285, filed on Nov. 23, 2021.

(30) Foreign Application Priority Data

Apr. 27, 2021 (CN) .......................... 202110461891.0

(51) Int. Cl.
*G02B 27/01* (2006.01)
*G02B 7/12* (2021.01)

(52) U.S. Cl.
CPC ........... *G02B 27/0176* (2013.01); *G02B 7/12* (2013.01)

(58) Field of Classification Search
CPC .............................. G02B 27/0176; G02B 7/12
USPC .................................................. 359/811, 819
See application file for complete search history.

(56) References Cited

U.S. PATENT DOCUMENTS

| 4,132,472 A | 1/1979 | Urano et al. |
| 2009/0300828 A1 | 12/2009 | Chiang |
| 2014/0233108 A1 | 8/2014 | Cazalet |

(Continued)

FOREIGN PATENT DOCUMENTS

| CN | 101359079 A | 2/2009 |
| CN | 203577098 U | 5/2014 |
| CN | 103941526 A | 7/2014 |

(Continued)

OTHER PUBLICATIONS

Chinese First Office Action for application No. 2021104618191.0 dated Apr. 27, 2021.

(Continued)

*Primary Examiner* — William Choi
(74) *Attorney, Agent, or Firm* — Moser Taboada

(57) ABSTRACT

A packaging structure of head mounted terminal and a head mounted terminal are disclosed. The packaging structure comprises an annular rear casing and a soft rubber member, and the soft rubber member is disposed between the rear casing and two lenses of the head mounted terminal. The outer edge of the soft rubber member is fixed on the inner ring of the rear casing, the soft rubber member comprises two lens barrels arranged symmetrically, and the two lens barrels are respectively sleeved on the two lenses of the head mounted terminal. The soft rubber member further comprises an extending and folding part disposed on an outer periphery of the lens barrel, which is used to realize the extension of the lens barrel with the left and right movement of the lens.

20 Claims, 2 Drawing Sheets

(56) References Cited

U.S. PATENT DOCUMENTS

2019/0212568 A1* 7/2019 Yan .................. G02B 30/00

FOREIGN PATENT DOCUMENTS

| | | | |
|---|---|---|---|
| CN | 104102077 A | 10/2014 | |
| CN | 104914579 A | 9/2015 | |
| CN | 204705764 U | 10/2015 | |
| CN | 205720875 U | 11/2016 | |
| CN | 207336933 U | 5/2018 | |
| CN | 109239925 A | 1/2019 | |
| CN | 209014821 U * | 6/2019 | ......... G02B 27/0172 |
| CN | 209311791 U | 8/2019 | |
| CN | 110262055 A | 9/2019 | |
| CN | 210125169 U | 3/2020 | |
| CN | 210573019 U | 5/2020 | |
| CN | 212345395 U | 1/2021 | |
| CN | 212852571 U | 4/2021 | |
| CN | 213023776 U | 4/2021 | |
| CN | 113391448 A | 9/2021 | |
| EP | 0827761 A1 | 3/1998 | |
| JP | 2007322789 A | 12/2007 | |
| WO | WO 2020123006 A2 | 6/2020 | |

OTHER PUBLICATIONS

International Search Report for application No. PCT/CN2021/132285, dated Nov. 2, 2022.

* cited by examiner

PACKAGING STRUCTURE OF HEAD MOUNTED TERMINAL AND HEAD MOUNTED TERMINAL

CROSS-REFERENCE TO RELATED APPLICATIONS

This application is entered as a bypass continuation application under 35 U.S.C. § 111(a) of International Application No. PCT/CN2021/132285, filed on Nov. 23, 2021, which claims priority to Chinese Patent Application No. 202110461891.0, filed on Apr. 27, 2021. The embodiment of the priority applications are hereby incorporated herein in their entirety by reference.

TECHNICAL FIELD

The present disclosure belongs to the technical field of head mounted terminal, in particular to a packaging structure of head mounted terminal and a head mounted terminal.

BACKGROUND

Since each person has a different pupil spacing, the distance between the two lenses needs to be adjusted to meet the needs of users when wearing a head mounted terminal. At present, there are mainly two modes to adjust the lens spacing on the head mounted terminal. In the first mode, the two lenses are clearance-fitted with the rear casing of the head mounted terminal for the adjustment and movement of the lens. In the second mode, the two lenses are directly exposed outside the rear casing for the adjustment and movement. The mode of clearance-fit of the lens with the rear casing has the problem of poor dust-proof performance. In the mode that the lens directly extends out of the rear casing, the dust-proof performance is not good enough, and the appearance is not beautiful either.

SUMMARY

In view of the above problems, the present disclosure discloses a packaging structure of head mounted terminal and a head mounted terminal to overcome the above problems or at least partially solve the above problems.

In order to achieve the above object, the present disclosure adopts the following technical solutions.

An aspect of the present disclosure provides a packaging structure of head mounted terminal, which comprises an annular rear casing and a soft rubber member, wherein the soft rubber member is disposed between the rear casing and two lenses of the head mounted terminal;

an outer edge of the soft rubber member is fixed on an inner ring of the rear casing, the soft rubber member comprises two lens barrels arranged symmetrically, and the two lens barrels are respectively sleeved on the two lenses of the head mounted terminal;

the soft rubber member further comprises an extending and folding part disposed on an outer periphery of the lens barrel, which is used to realize the extension of the lens barrel with the left and right movement of the lens.

Further, the soft rubber member further comprises an arc-shaped corrugated part disposed between the two lens barrels for making the soft rubber member closely fit the user's nose bridge.

Further, the lens barrel is provided with a flange, which engages with a groove on an outer circumference of the lens to realize connection between the lens barrel and the lens.

Further, a plurality of connecting parts are symmetrically disposed on the outer edge of the soft rubber member, the connecting part is provided with a connecting hole, a position on a front side of the rear casing which corresponds to the connecting hole is provided with a connecting column, and the connecting hole is sleeved on the connecting column.

Further, the connecting column is provided with a screw hole, and a fixed connection between the soft rubber member and the rear casing is strengthened by adding a screw in the screw hole.

Further, the rear casing and the soft rubber member are assembled and integrated by secondary molding.

Further, the soft rubber member is made of silicone; the rear casing is made of PC, ABS or PP.

Further, the rear casing is provided with a relief part to accommodate the user's nose; the arc-shaped corrugated part is disposed on an inner side of the relief part.

Further, the packaging structure further comprises a soft face pad fixed on a rear side of the rear casing.

Another aspect of the present disclosure provides a head mounted terminal comprising any one of the packaging structures as stated above.

The advantages and beneficial effects of the present disclosure are as follows.

According to the present disclosure, the soft rubber member is provided between the rear casing of the head mounted terminal and the two lenses of the head mounted terminal, and the extending and folding part on the soft rubber member can extend with the left and right movement of the lens, so the spacing between the two lenses can be adjusted without setting a gap between the rear casing and the lens, the dust-proof performance is better, the packaging structure is simple and beautiful, and the manufacturing cost is low.

BRIEF DESCRIPTION OF DRAWINGS

By reading the detailed description of the preferred embodiments below, various other advantages and benefits will become clear to a person of ordinary skill in the art. The drawings are only used for the purpose of illustrating the preferred embodiments, and should not be considered as a limitation to the present disclosure. Moreover, throughout the drawings, the same reference numerals are used to denote the same components. In the drawings.

Figure 1:
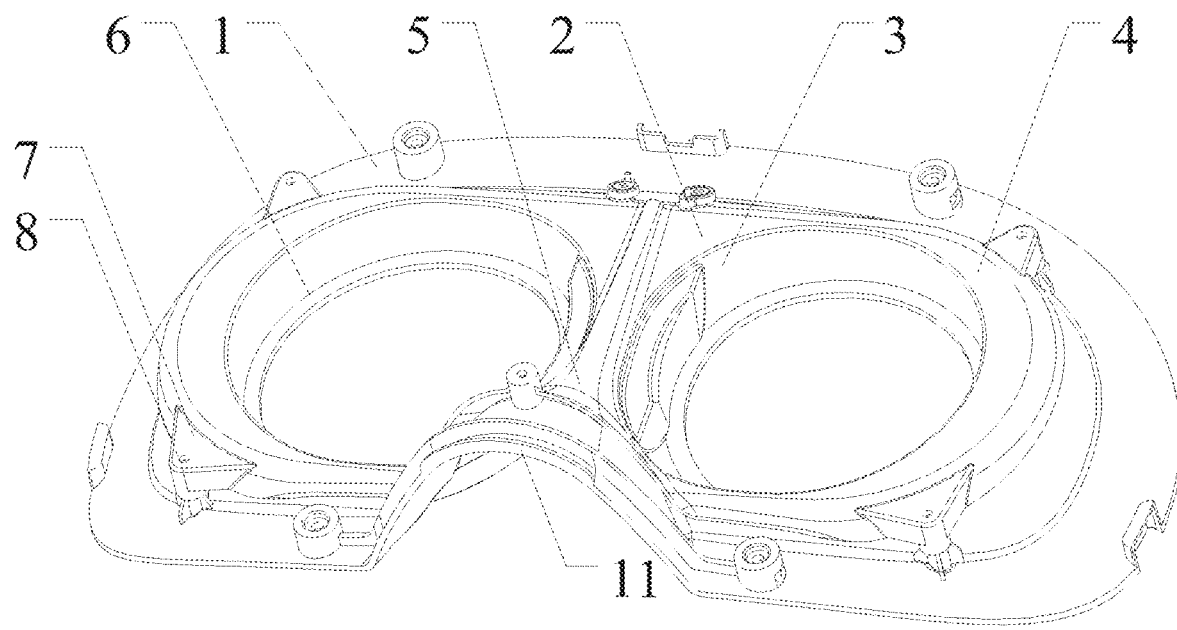
FIG. 1 is a view of the structure of the front side of a packaging structure in an embodiment of the present disclosure.

In the drawings: 1. rear casing; 2. soft rubber member; 3. lens barrel; 4. extending and folding part; 5. arc-shaped corrugated part; 6. flange; 7. connecting part; 8. connecting hole; 9. connecting column; 10. screw hole; 11. relief part.

DETAILED DESCRIPTION

In order to make the objectives, technical solutions, and advantages of the present application clearer, the technical solutions of the present application will be described clearly and completely in conjunction with specific embodiments of the present application and corresponding drawings. Obviously, the described embodiments are only part of the embodiments of the present application, rather than all of the embodiments. Based on the embodiments in the present application, all other embodiments obtained by a person of ordinary skill in the art without paying creative work shall fall within the protection scope of the present application.

The technical solutions according to various embodiments of the present disclosure will be described in detail below in conjunction with the accompanying drawings.

Figure 2:
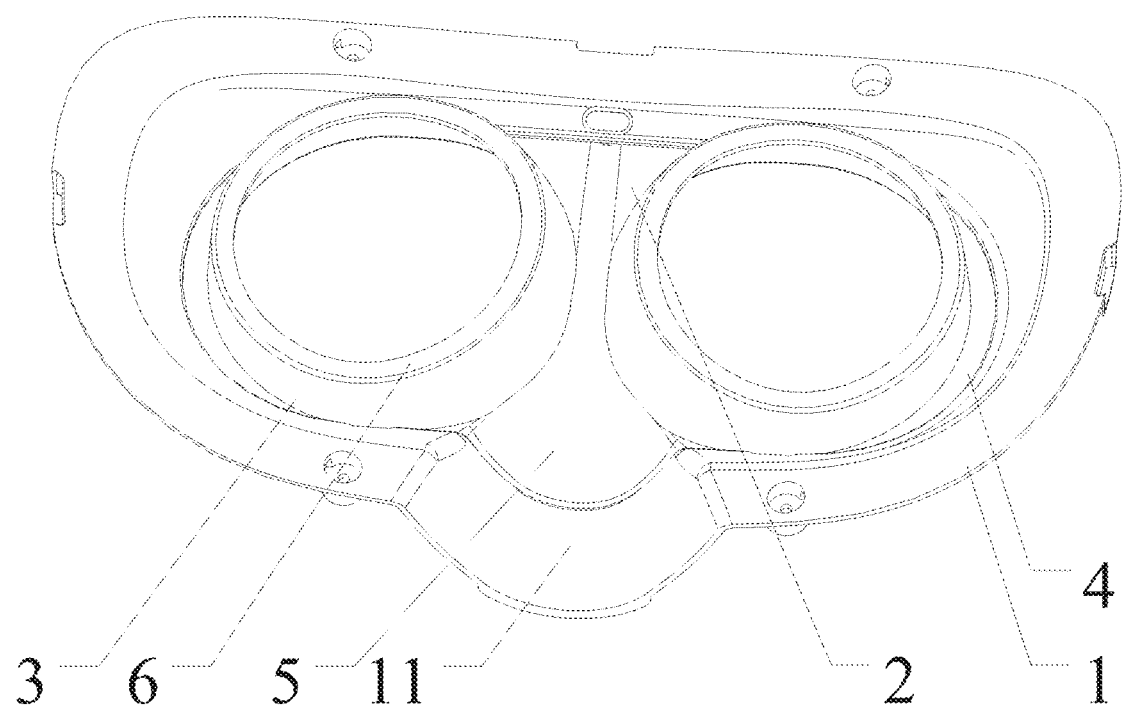
FIG. 2 is a view of the structure of the rear side of a packaging structure in an embodiment of the present disclosure.

An embodiment of the present disclosure discloses a packaging structure of head mounted terminal. As shown in FIGS. 1-2, the packaging structure comprises an annular rear casing 1 and a soft rubber member 2. The soft rubber member 2 is disposed between the rear casing 1 and two lenses of the head mounted terminal to realize the sealing between the rear casing 1 and the lens. The rear casing 1 is used to support the rear part of the head mounted terminal. The two lenses of the head mounted terminal are disposed in the inner ring of the rear casing 1.

The outer edge of the soft rubber member 2 is fixed on the inner ring of the rear casing 1. The soft rubber member 2 comprises two lens barrels 3 arranged symmetrically. The two lens barrels 3 are respectively sleeved on the two lenses of the head mounted terminal, and can move with the movement of the lens.

The soft rubber member 2 further comprises an extending and folding part 4 disposed on an outer periphery of the lens barrel 3, which is used to realize the extension of the lens barrel 3 with the left and right movement of the lens. For example, when the driving device in the head mounted terminal drives a lens to move towards the right for pupil spacing adjustment, the extending and folding part 4 on the right side retracts while the extending and folding part 4 on the left side extends.

In sum, in the packaging structure of the present embodiment, the soft rubber member 2 is provided between the rear casing 1 of the head mounted terminal and the two lenses of the head mounted terminal, and the extending and folding part 4 on the soft rubber member 2 can extend with the left and right movement of the lens, so the spacing between the two lenses can be adjusted without setting a gap between the rear casing 1 and the lens, the dust-proof performance is better, the packaging structure is simple and beautiful, and the manufacturing cost is low.

Figure 4:
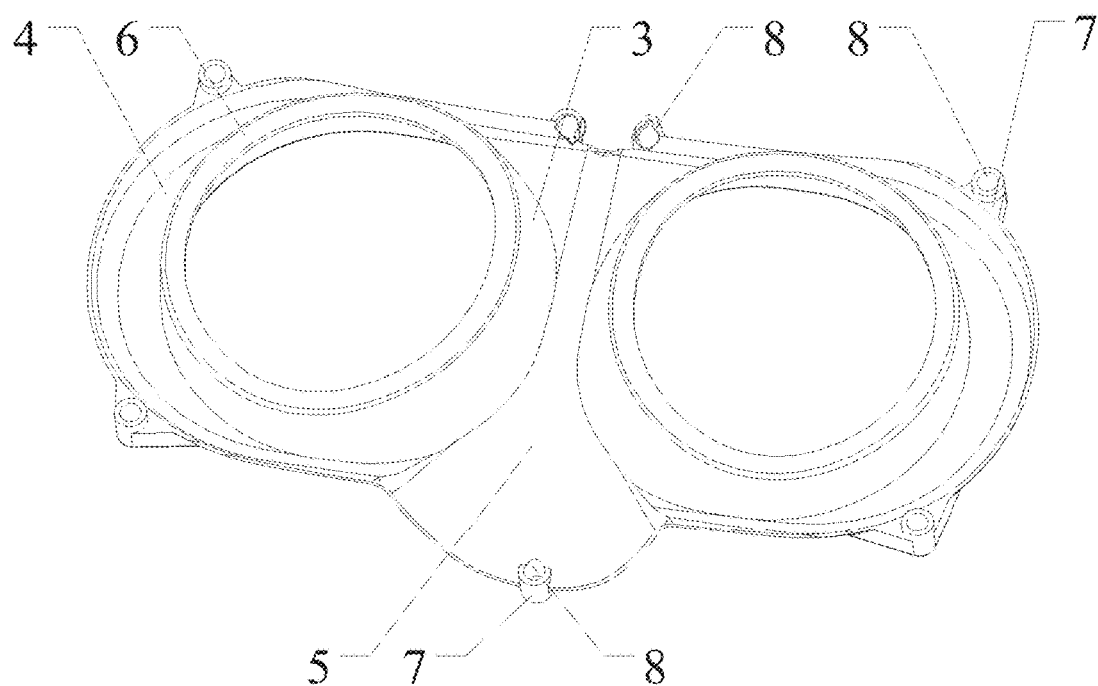
FIG. 4 is a view of the structure of the rear side of a soft rubber member in an embodiment of the present disclosure.

In an embodiment, as shown in FIGS. 1-2 and 4, the soft rubber member 2 further comprises arc-shaped corrugated part 5 disposed between two lens barrels 3 to make the soft rubber member 2 closely fit the user's nose bridge. The upper part of the arc-shaped corrugated part 5 is strip-shaped, and the lower part of the arc-shaped corrugated part 5 is fan-shaped, so that the arc-shaped corrugated part 5 can fit with different nose shapes. When the user wears the head mounted terminal, since the arc-shaped corrugated part 5 fit with the user's nose bridge, there is no need to provide other soft materials between the rear casing 1 of the head mounted terminal and the user's nose bridge for protection and shielding.

Preferably, as shown in FIGS. 1-2 and 4, the lens barrel 3 is provided with a flange 6, and the flange 6 engages with a groove on the outer circumference of the lens to realize the connection between the lens barrel 3 and the lens. Such a structure can prevent dust from entering the interior of the head mounted terminal and prevent the lens barrel 3 from sliding relative to the lens.

Figure 3:
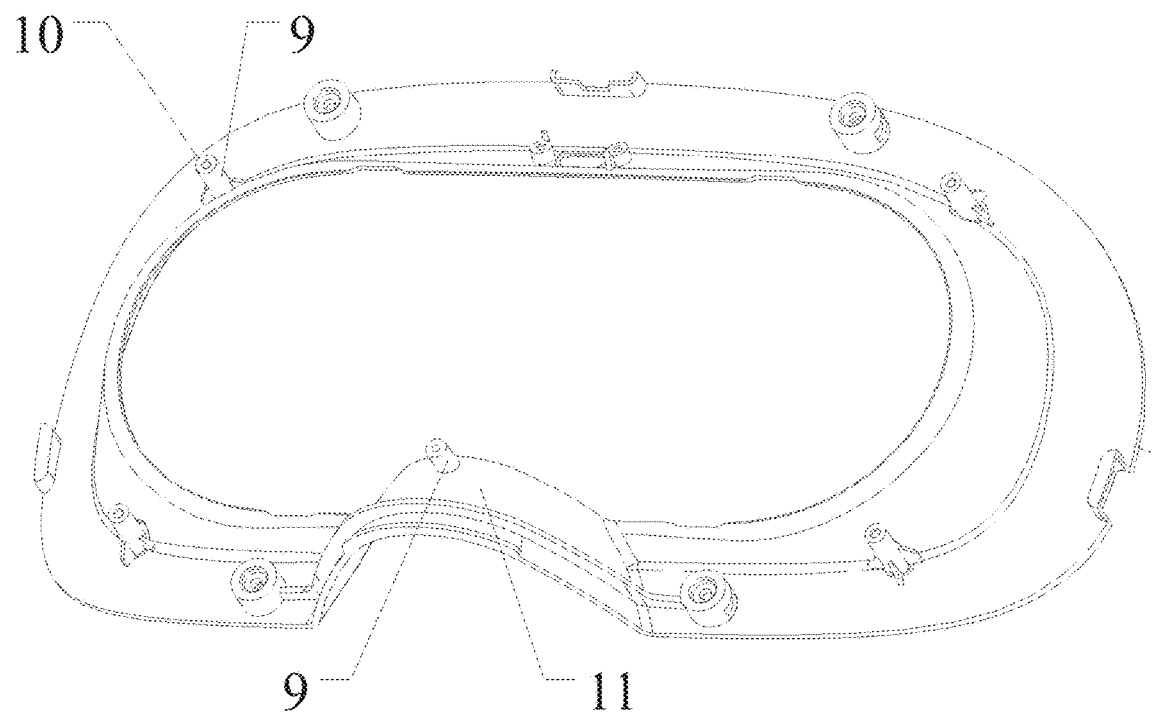
FIG. 3 is a view of the structure of the front side of a rear casing in an embodiment of the present disclosure.

In an embodiment, as shown in FIGS. 1 and 3-4, a plurality of connecting parts 7 are symmetrically provided on the outer edge of the soft rubber member 2. The connecting part 7 is provided with a connecting hole 8. A position on the front side of the rear casing 1 which corresponds to the connecting hole 8 is provided with a connecting column 9. The connecting hole 8 is sleeved on the connecting column 9 to realize the fixed connection between the rear casing 1 and the soft rubber member 2.

Preferably, the connecting column 9 is provided with a screw hole 10, and the fixed connection between the soft rubber member 2 and the rear casing 1 is strengthened by adding a screw in the screw hole 10.

In an embodiment, the rear casing 1 and the soft rubber member 2 are assembled and integrated by secondary molding. The rear casing 1 and the soft rubber member 2 are pressed together under the condition of heating to make them integral, so as to increase the firmness and sealing performance of the connection between the rear casing 1 and the soft rubber member 2.

In a preferred embodiment, the soft rubber member 2 is made of silicone; the rear casing 1 is made of PC (polycarbonate), ABS (acrylonitrile butadiene styrene copolymer) or PP (polypropylene). Of course, the rear casing 1 may be made of other materials having certain strength and toughness.

In an embodiment, as shown in FIGS. 1-3, a relief part 11 is provided on the rear casing 1 to accommodate the user's nose and make the head mounted terminal fit better with the user's face. The arc-shaped corrugated part 5 are disposed on the inner side of the relief part 11. When the user puts on the head mounted terminal, the arc-shaped corrugated part 5 fit with the user's nose bridge, so that the relief part 11 is suspended above the nose, thereby preventing the relief part 11 from directly contacting the nose, and thus improving the comfort.

In an embodiment, the packaging structure further comprises a soft face pad fixed on the rear side of the rear casing 1. The soft face pad can protect the user's face, and at the same time, can also prevent external light from entering the lens and interfering with the visual experience when using the head mounted terminal. The soft face pad may be fixed on the rear casing 1 by adhesive. The soft face pad is made of rubber, sponge or silicone.

An embodiment of the present disclosure discloses a head mounted terminal, which comprises the packaging structure according to any of the above embodiments. The head mounted terminal has good dust-proof performance and good appearance.

The above only describes the specific embodiments of the present disclosure. Under the above teaching of the present disclosure, a person skilled in the art can make other improvements or modifications on the basis of the above embodiments. A person skilled in the art should understand that the above specific description is only for better explaining the present disclosure, and the protection scope of the present disclosure should be subject to the protection scope of the claims.

What is claimed is:

1. A packaging structure of a head mounted terminal, comprising an annular rear casing and a soft rubber member, wherein:

the soft rubber member is disposed between the rear casing and two lenses of the head mounted terminal, an outer edge of the soft rubber member is fixed on an inner ring of the rear casing, the soft rubber member comprises two lens barrels arranged symmetrically, and the two lens barrels are respectively sleeved on the two lenses of the head mounted terminal, the soft rubber member further comprises an extending and folding part disposed on an outer periphery of the lens barrel, which is used to realize extension of the lens barrel with left and right movement of the lens, and the soft rubber member further comprises arc-shaped corrugated part disposed between the two lens barrels for making the soft rubber member closely fit the user's nose bridge.

2. The packaging structure according to claim 1, wherein the lens barrel is provided with a flange, which engages with a groove on an outer circumference of the lens to realize connection between the lens barrel and the lens.

3. The packaging structure according to claim 1, wherein the rear casing and the soft rubber member are assembled and integrated by secondary molding.

4. The packaging structure according to claim 1, wherein the soft rubber member is made of silicone; the rear casing is made of PC, ABS or PP.

5. The packaging structure according to claim 1, wherein a relief part is provided on the rear casing to accommodate the user's nose; the arc-shaped corrugated part is disposed on an inner side of the relief part.

6. The packaging structure according to claim 1, wherein the packaging structure further comprises a soft face pad fixed on a rear side of the rear casing.

7. A head mounted terminal, comprising a packaging structure according to claim 1.

8. The head mounted terminal according to claim 7, wherein the lens barrel is provided with a flange, which engages with a groove on an outer circumference of the lens to realize connection between the lens barrel and the lens.

9. The head mounted terminal according to claim 7, wherein the rear casing and the soft rubber member are assembled and integrated by secondary molding.

10. The head mounted terminal according to claim 7, wherein the soft rubber member is made of silicone; the rear casing is made of PC, ABS or PP.

11. The head mounted terminal according to claim 7, wherein a relief part is provided on the rear casing to accommodate the user's nose; the arc-shaped corrugated part is disposed on an inner side of the relief part.

12. The head mounted terminal according to claim 7, wherein the packaging structure further comprises a soft face pad fixed on a rear side of the rear casing.

13. The packaging structure according to claim 1, wherein a plurality of connecting parts are symmetrically disposed on an outer edge of the soft rubber member, the connecting part is provided with a connecting hole, a position on a front side of the rear casing which corresponds to the connecting hole is provided with a connecting column, and the connecting hole is sleeved on the connecting column.

14. A packaging structure of a head mounted terminal, comprising an annular rear casing and a soft rubber member, wherein:

the soft rubber member is disposed between the rear casing and two lenses of the head mounted terminal, an outer edge of the soft rubber member is fixed on an inner ring of the rear casing, the soft rubber member comprises two lens barrels arranged symmetrically, and the two lens barrels are respectively sleeved on the two lenses of the head mounted terminal, the soft rubber member further comprises an extending and folding part disposed on an outer periphery of the lens barrel, which is used to realize extension of the lens barrel with left and right movement of the lens, and a plurality of connecting parts are symmetrically disposed on an outer edge of the soft rubber member, the connecting part is provided with a connecting hole, a position on a front side of the rear casing which corresponds to the connecting hole is provided with a connecting column, and the connecting hole is sleeved on the connecting column.

15. The packaging structure according to claim 14, wherein the connecting column is provided with a screw hole, and a fixed connection between the soft rubber member and the rear casing is strengthened by adding a screw in the screw hole.

16. A head mounted terminal, comprising a packaging structure according to claim 14.

17. The head mounted terminal according to claim 16, wherein the connecting column is provided with a screw hole, and a fixed connection between the soft rubber member and the rear casing is strengthened by adding a screw in the screw hole.

18. The packaging structure according to claim 14, wherein the lens barrel is provided with a flange, which engages with a groove on an outer circumference of the lens to realize connection between the lens barrel and the lens.

19. The packaging structure according to claim 14, wherein the rear casing and the soft rubber member are assembled and integrated by secondary molding.

20. The packaging structure according to claim 14, wherein the packaging structure further comprises a soft face pad fixed on a rear side of the rear casing.

* * * * *